United States Patent [19]

de Jong et al.

[11] Patent Number: 5,287,162
[45] Date of Patent: Feb. 15, 1994

[54] METHOD AND APPARATUS FOR CORRECTION OF COLOR REGISTRATION ERRORS

[75] Inventors: Joannes N. M. de Jong, Suffern; Vittorio R. Castelli, Yorktown Heights, both of N.Y.; Harold M. Anderson, Rancho Palos Verdes, Calif.; Lloyd Williams, Mahopac, N.Y.

[73] Assignee: Xerox Corporation, N.Y.

[21] Appl. No.: 899,187

[22] Filed: Jun. 16, 1992

[51] Int. Cl.$^5$ ............................................. G03G 15/01
[52] U.S. Cl. .................................. 355/326 R; 226/29; 355/208
[58] Field of Search ............ 118/645; 346/157; 355/203, 204, 208, 326, 327, 328; 226/29, 30

[56] References Cited

U.S. PATENT DOCUMENTS 4,903,067  2/1990  Murayama et al. ............ 355/326 X

Primary Examiner—Benjamin R. Fuller
Assistant Examiner—J. E. Barlow, Jr.
Attorney, Agent, or Firm—Oliff & Berridge

[57] ABSTRACT

A detection system includes a marking device for applying to a process medium a first chevron from a first printer, a second chevron from a second printer and a third chevron from both the first printer and the second printer, the third chevron having a first element applied from the first printer and a second element applied from the second printer. The detection system further includes a detection device for detecting a matrix of times including three pluralities of times, each of the three pluralities of times corresponding to a respective time of passage of the first, second and third chevrons by the detection device. The detection system further includes a determining device for determining the alignment error based on a function of the three pluralities of times. A control system includes a marking device for applying to a process medium a first chevron from a first printer, a second chevron from a second printer and a third chevron from both the first printer and the second printer. The control system further includes a detection device for detecting a matrix of times including three pluralities of times, each of the three pluralities of times corresponding to a time of passage of a respective one of the first, second and third chevrons by the detection device, a determining device for determining an alignment error based on a function of the matrix of times, and a control device for minimizing the alignment error.

22 Claims, 7 Drawing Sheets

METHOD AND APPARATUS FOR CORRECTION OF COLOR REGISTRATION ERRORS

BACKGROUND OF THE INVENTION

1. Field of the Invention

The present invention relates to the registration of color images in a color image output terminal. More particularly, the invention relates to an improved color image alignment system and an improved method and apparatus for detecting registration errors between color separations and a method and apparatus to correct certain color registration errors.

2. Description of the Related Art

Image registration is an important and difficult problem in a xerographic color image output terminal. In FIG. 1, a color image output terminal 10 is shown having four photoreceptors 12, 14, 16 and 18. Each photoreceptor carries a unique color separation obtained by a conventional xerographic processor having charge device 20, write device 22 and develop device 24. The four color separations are transferred to intermediate belt 26 so as to coincide with one another and produce a full color image. Subsequently, the color image is transferred to paper and the color image is fixed thereon. Alternatively, belt 26 can be a copy sheet conveyor so that the four color separations are transferred directly to the delivery medium. Photoreceptors 12, 14, 16 and 18 are driven by rotating members 1, 2, 3 and 4 respectively. Belt 26 is driven by rotating member 5.

In order to deliver good quality images, strict specifications are imposed on the accuracy with which the color image output terminal 10 superimposes the various color separations which compose the individual images. This juxtaposition accuracy is often called registration. In the trade, a limit of 125 micrometers is considered a maximum for acceptable misregistration errors of quality pictorial color images and a 75 micrometer limit is often imposed as a limit by the manufacturers of top quality equipment. These numbers represent the diameter of a circle which would encompass all supposedly homologous color dots.

In a single pass image output terminal, the various color separations are produced by separate imaging members and are passed to the intermediate belt where they are collected in juxtaposition. Registration errors can arise from motion errors of the collecting device and from mismatch of the individual color separations from the imaging device.

With respect to the motion of the collecting device, good registration goals are attainable if the unit is designed such that its kinematic errors are made synchronous with the spacing distance between successive image transfer points of the photoreceptors 12, 14, 16 and 18 and belt 26. In this manner, the modulation of the surface motion is repeatable (synchronous) with the imaging pitch and color-on-color separation errors are minimized. Although the absolute position error of each color may be large, the relative position error between colors is held to specification. The absolute image distortion is usually tolerable. In tandem image output terminals, where the separations are generated and developed on individual photoreceptors and then transferred to an intermediate belt, a mismatch in the motion errors of the photoreceptors contributes to misregistration.

In tandem image output terminals, where the separations are generated and developed on individual photoreceptors and then transferred to an intermediate belt, problems arise due to mismatch in the motion errors of the photoreceptors and due to the photoreceptor eccentricity and wobble. The mismatch contributes to misregistration in the process direction; the eccentricity contributes to variable lateral magnification error; and wobble contributes to lateral registration variations. The eccentricity and wobble contributions exist only in machines where the writing is performed by a light beam scanning through a finite angle (usually called ROS for Raster Output Scanner). Image bars do not present these problems.

One common way of improving registration is described in U.S. Pat. No. 4,903,067 to Murayama et al. Murayama et al. employ a marking system with a detector for measuring alignment errors and mechanically move individual color printers to correct misalignment.

Color printers that employ marks produced by each of the constituent colors in juxtaposition with each other enable correction of lateral and longitudinal relative position, skew and magnification. The marks may be machine readable, and data may be processed to measure registration errors for the purpose of automating registration error correction. However, such corrections cannot compensate for the errors introduced by mismatch in the velocity variations of the photoreceptors because these errors differ both in phase and magnitude and are in no way steady or synchronous with the image transfer pitch. For example, a photoreceptor drum characterized by an eccentricity and wobble may rotate with an instantaneous rotational velocity that repeatably varies as a function of the rotational phase angle such that an average rotational velocity over a complete rotation would inaccurately characterize the instantaneous rotational velocity at any single rotational phase angle.

FIG. 2 shows a conventional method for making registration marks and detecting their errors using four chevron marks and two split (bi-cell) detectors. The four chevrons in FIG. 2, denoted KK, MM, CC and YY, are shown in registration to each other. Chevron KK is printed by a black printer, for example printer 1 in FIG. 1. Chevron MM is printed by a magenta printer, for example printer 2 in FIG. 1. Chevron CC is printed by a cyan printer, for example printer 3 in FIG. 1. Chevron YY is printed by a yellow printer, for example printer 4 in FIG. 1. The chevrons are sequentially printed on a process medium, for example intermediate belt 26 in FIG. 1. The process medium carries the chevrons past a pair of fixed detectors D1 and D2 in FIG. 2. Detectors D1 and D2 are typically bi-cell detectors (also called split detectors), although they may be CCD (charge coupled device) detectors. As each chevron moves past a detector, the detector determines the time of passage.

The conventional detection system measures alignment errors in both the process direction 32 and in a lateral direction, transverse the process direction, by determining the alignment error from the times of passage of the centroids of the chevrons past the centers of detectors D1 and D2.

The times of passage are determined as:

$T_{1KK}$ is the time when the centroid of the KK chevron passes through the center of the split detector D1;

$T_{1MM}$ is the time when the centroid of the MM chevron passes through the center of the split detector D1;

$T_{1CC}$ is the time when the centroid of the CC chevron passes through the center of the split detector D1;

$T_{1YY}$ is the time when the centroid of the YY chevron passes through the center of the split detector D1;

$T_{2KK}$ is the time when the centroid of the KK chevron passes through the center of the split detector D2;

$T_{2MM}$ is the time when the centroid of the MM chevron passes through the center of the split detector D2;

$T_{2CC}$ is the time when the centroid of the CC chevron passes through the center of the split detector D2; and $T_{2YY}$ is the time when the centroid of the YY chevron passes through the center of the split detector D2. $T_0$ is the ideal time at which the centroid of the KK chevron would pass the center of a split detector, V is the velocity of the process medium in the process direction, and S is a pitch distance between the registration chevrons. In order to compute the registration error, perfect knowledge of either S or V is assumed. Assuming that S is known perfectly, the shift in the lateral position of the black chevron from its ideal location is given by:

$$E_{KK} = 0.5 * V * (T_{2KK} - T_{1KK}).$$

The shift in the process direction position of the black chevron from its ideal location is given by:

$$F_{KK} = 0.5 * V * (T_{2KK} + T_{1KK} - 2 * T_0).$$

The shift in the lateral position of the magenta chevron from its ideal location is given by:

$$E_{MM} = 0.5 * V * (T_{2MM} - T_{1MM}).$$

The shift in the process direction position of the magenta chevron from its ideal location is given by:

$$F_{MM} = 0.5 * V * (T_{2MM} + T_{1MM} - 2 * T_0 - 2 * S/V).$$

The lateral alignment error of the magenta printer relative to the black printer is given by:

$$E_{MM} - E_{KK} = 0.5 * (T_{2MM} - T_{1MM} + T_{1KK} - T_{2KK}) * V.$$

The process direction alignment error of the magenta printer relative to the black printer is given by:

$$F_{MM} - F_{KK} = 0.5 * (T_{2MM} + T_{1MM} - T_{1KK} - T_{2KK}) * V - S.$$

In a similar manner, the registration errors of the cyan and yellow printers relative to the black printer are determined.

The computation of the lateral position error involves small differences in time (i.e., $T_{2KK} - T_{1KK}$ and $T_{2MM} - T_{1MM}$) multiplied by the velocity. Its accuracy is proportionate to the accuracy with which the velocity is known. The computation of process direction error, however, involves the differences between two large numbers (i.e., $0.5 * V * (T_{2MM} + T_{1KK} - T_{2MM} - T_{1MM})$ and S), only one of which has velocity as a factor. Thus, the accuracy of computing the process direction registration error is more highly dependent upon the accuracy of the velocity.

In machine architectures where rotation of the photoreceptor supporting members 1, 2, 3, and 4 and belt drive member 5 (of FIG. 1) are controlled by closed loop servos with feedback from encoders, the run out error of the encoder shaft (eccentricity between the encoder shaft and the roll centers of rotating members 1, 2, 3, 4 and 5) adds to the inherent encoder error and becomes a significant factor.

A major expense in the production of closed loop velocity or position servos is the cost of an encoder. Very accurate encoders (Heidenhain) are priced at a few thousand dollars; encoders of medium accuracy cost a few hundred dollars; and low accuracy encoders cost as little as 25 dollars. To approximate costs, an increase of one order of magnitude in encoder accuracy increases the prices by about one order of magnitude.

Thus, a need exists for a calibration technique that will provide calibration of low accuracy encoders with repeatable rotational phase angle related components of readout errors so that, with only modest increase in cost, they provide the accuracy of the high-priced encoders.

The prior art discloses encoders and methods for improving the accuracy. For example, U.S. Pat. No. 4,593,193 to Michaelis discloses an apparatus and method wherein a servo controller uses generated pulses to calibrate an encoder. A counter is used to keep track of encoder pulses, and a memory stores a calculated error of the pulse. U.S. Pat. No. 4,224,515 to Terrell discloses a high-accuracy optical shaft encoder system wherein an encoder outputs a sine wave. The sine wave is compared to a reference sine wave from a frequency generator and is fed back to control the encoder. U.S. Pat. No. 4,633,224 to Gipp et al. discloses an absolute and incremental optical encoder wherein an algorithm is taught which improves encoder accuracy by using an encoder's absolute position signal and incremental position signal and then comparing these to a stored value. U.S. Pat. No. 3,998,088 to Kazangey discloses a testing apparatus for an incremental shaft encoder wherein a gyroscope is used to accurately test the encoder. U.S. Pat. Nos. 4,792,672 to Spies and 4,806,752 to Fischer each disclose an incremental encoder with a clamping device and a laser rotary encoder.

The concept of using a look-up table for calibration purposes is disclosed in U.S. Pat. No. 4,873,655 to Kondraske wherein a sensor conditioning method and apparatus calibrates a sensor by a look-up table generated by a microprocessor.

The prior art, however, fails to provide a control system using a calibration technique and correction technique for increasing the accuracy of a servo control and removing repeatable rotational phase angle related components of encoder readout errors using a low cost encoder so that it can function with the accuracy of a servo control using a high cost encoder.

SUMMARY OF THE INVENTION

When the information given by the chevron marks is spatially sufficiently dense, a control system ascertains the part of the registration error which is due to the repeatable motion error of the photoreceptors and to their eccentricity and wobble. Likewise, other components of registration error which are repeatably associated with specific machine components and control systems are identified.

It is an object of the present invention to overcome the limitations in the prior art. Yet another object of the present invention is to employ registration error distributions measured with sufficient spatial resolution by sensors such as, but not limited to, one using chevron marks and split cell detectors. From such registration error distributions, calibration tables are generated which are used to permanently correct velocity control parameters in controlling photoreceptors or other parts of machines such as color output terminals which have motion errors repeatable in amplitude and phase.

These and other objects are achieved with an alignment system including a sensing system for detecting an alignment error, and a control system for minimizing the alignment error.

These and other objects are achieved with a detection system in a color imaging output terminal including a marking device for applying to a process medium a first chevron from a first printer, a second chevron from a second printer and a third chevron from both the first printer and the second printer, the third chevron having a first element applied from the first printer and a second element applied from the second printer. The detection system further includes a detection device for detecting a matrix of times including three pluralities of times, each of the three pluralities of times corresponding to a respective time of passage of the first, second and third chevrons by the detection device. The detection system further includes a determining device for determining the alignment error based on a function of the three pluralities of times.

These and other objects are achieved with a control system for minimizing an alignment error including a calibration system for producing a calibration table representative of a repeatable component of the alignment error corresponding to a rotational phase angle, and a correction system for minimizing the alignment error based on a function of the calibration table.

These and other objects are also achieved with a control system in a color imaging output terminal including a marking device for applying to a process medium a first chevron from a first printer, a second chevron from a second printer and a third chevron from both the first printer and the second printer. The control system further includes a detection device for detecting a matrix of times including three pluralities of times, each of the three pluralities of times corresponding to a time of passage of a respective one of the first, second and third chevrons by the detection device, a determining device for determining an alignment error based on a function of the matrix of times, and a control device for minimizing the alignment error.

BRIEF DESCRIPTION OF THE DRAWINGS

The invention will be described in detail in the following description of the preferred embodiments with reference to the following figures, wherein.

DETAILED DESCRIPTION OF THE PREFERRED EMBODIMENTS

Figure 3:
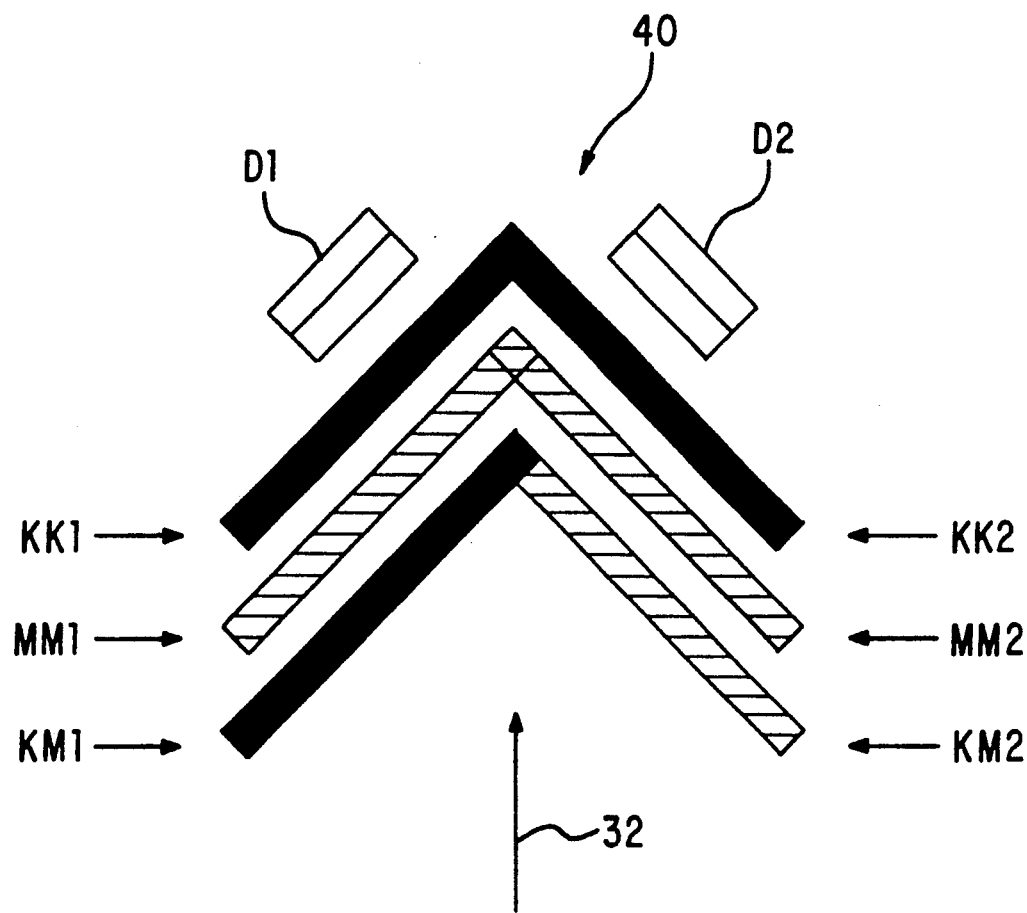
FIG. 3 shows a chevron mark of the present invention for registering one color printer relative to a black printer.

In FIG. 3, a composite chevron mark includes three chevrons. Each chevron includes a first element (i.e., first arm) and a second element (i.e., second arm). A first chevron includes elements KK1 and KK2; a second chevron includes elements MM1 and MM2; and a third chevron includes elements KM1 and KM2. Elements KK1, KK2 and KM1 are printed by the black printer and elements MM1, MM2 and KM2 are printed by the magenta printer. The three chevrons are carried along in a process direction 32 by a process medium so as to sequentially pass detectors D1 and D2. Elements KK1, MM1 and KM1 pass detector D1 at times $T_{1KK}$, $T_{1MM}$ and $T_{1KM}$ respectively, the three times comprising a first set of times. Similarly, elements KK2, MM2 and KM2 pass detector D2 at times $T_{2KK}$, $T_{2MM}$ and $T_{2KM}$ respectively, the three times comprising a second set of times.

Now the registration error in the process direction is determined by:

$$F_{MM} - F_{KK} = \{(T_{2KM} - T_{1KM}) - 0.5[(T_{2KK} - T_{1KK}) + (T_{2MM} - T_{1MM})]\} * V.$$

This relation has a weaker dependence upon the accuracy of the velocity than do prior art systems because all time differences have the same order of magnitude and the velocity simply multiplies their linear combination.

FIG. 3 shows a composite chevron mark 40 for aligning a magenta printer with a black printer. In a similar manner, composite chevron marks to align black and cyan printers, and to align black and yellow printers may be applied to a process medium to determine registration alignment errors of the cyan and yellow printers relative to the black printer.

Figure 4:
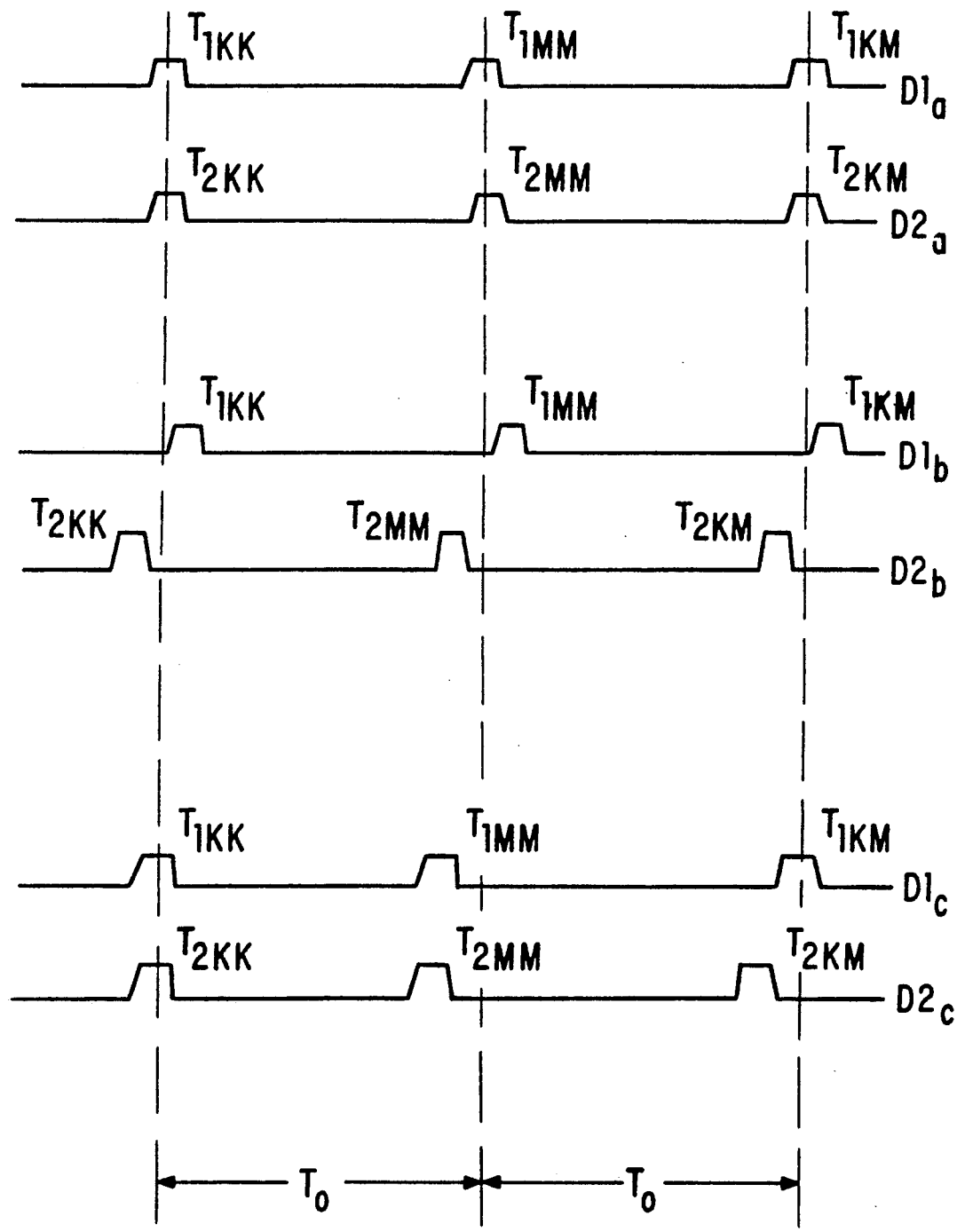
FIG. 4 is a timing diagram for a detector of the chevron mark of FIG. 3.

In FIG. 4, several timing diagrams are shown where the horizontal axis represents time and the vertical axis an electronic signal level. The passage of the centroid of an arm of a chevron mark over the center of a detector is processed by some electronic means so that the event is marked by an edge of the signal, for example, the event may be marked by either the rising edge or the falling edge of the signal. The other edge of the depicted pulses has the significance that the detecting electronics must bring the signal back to the base level before a new chevron passage is detected.

FIG. 4 shows a timing diagram illustrating the times of outputs from detectors D1 and D2 for three conditions: the first where the registration marks are in alignment, the second where the registration marks are laterally offset and the third where one printer is out of alignment with respect to the other printer in the process direction. In FIG. 4, $D1_a$ and $D2_a$ represent signals from detectors D1 and D2, respectively, when the registration marks are in alignment. $T_{1KK}$ and $T_{2KK}$, constituting a first plurality of times, indicate a time of passage of the KK chevron by detectors D1 and D2. $T_{1MM}$ and $T_{2MM}$, constituting a second plurality of times, indicate a time of passage of the MM chevron by detectors D1 and D2. $T_{1KM}$ and $T_{2KM}$, constituting a third plurality of times, indicate a time of passage of the KM chevron by detectors D1 and D2. The time difference between $T_{1KK}$ and $T_{1MM}$ is $T_0$ when the chevrons are in alignment, and the time difference between $T_{1MM}$ and $T_{1KM}$ is $T_0$ when the chevrons are in alignment.

$D1_b$ and $D2_b$ represent signals output from detectors D1 and D2 when all marks 40 (of FIG. 3) are laterally offset. When mark 40 is laterally offset, $T_{1KK}$, $T_{1MM}$ and $T_{1KM}$ are all delayed relative to a nominal time of passage by a first amount of time, and $T_{2KK}$, $T_{2MM}$ and $T_{2KM}$ are all advanced relative to a nominal time of passage by a second amount of time equal to the first amount of time.

$D1_c$ and $D2_c$ represent an output signal from detectors D1 and D2 when a magenta printer is advanced in the process direction relative to its correct registration position with respect to a black printer. Signal $D1_c$ indicates that $T_{1KK}$ and $T_{1KM}$ are correctly timed with respect to the nominal time of passage of the KK and KM chevrons, respectively, since these times represent the time of passage of the black elements of the chevrons. Similarly, $D1_c$ indicates $T_{1MM}$ is advanced relative to a nominal time of passage of chevron MM since the magenta printer is advanced relative to the black printer. $D2_c$ indicates that $T_{2KK}$ is aligned with a nominal time of passage of the KK chevron since the nominal time of passage represents the referenced black printer. However, $D2_c$ indicates that $T_{2MM}$ and $T_{2KM}$ are advanced relative to the nominal time of passage of the MM and KM chevrons since the magenta printer is advanced relative to the black printer.

In order to appreciate the advantages of this preferred embodiment, an example will be described. Assume that the actual velocity $V_t$, at the time the marks are detected, is higher than its nominal value V, when the marks are written. Further, assume that pitch $S = 0.00783$ inches, this value of S being selected so as to provide a capture range of $\pm 0.025$ inches in the process direction. Further assume that the black and magenta chevrons are actually within registration of each other in both the process direction and the lateral direction transverse to the process direction.

The lateral registration error is determined to be zero even though the actual velocity is greater than the nominal velocity because the term $(T_{2MM} - T_{1MM} + T_{1KK} - T_{2KK})$ equals zero. However, the conventional process for determining registration error will determine a significant error in the process direction. Considering just the black chevron followed by a magenta chevron, the process direction alignment error, as computed by prior art, is $$F_{MM} - F_{KK} = (S \cdot V/V_t) - S = S \cdot (V/V_t - 1),$$

since the marks are assumed to be in perfect registration. Thus, even with perfect registration being able to reduce the lateral alignment errors, the process direction alignment is erroneouly computed in conventional alignment processes due to the effect of the velocity.

For this example, the process direction alignment error is 0.00039 inches, 0.0015 inches and 0.0037 inches for actual velocities greater than nominal velocity by 0.5%, 2% and 3%, respectively. Since the process direction alignment error is proportional to pitch S, the process direction would be doubled for cyan and tripled for yellow since these colors follow the magenta chevron.

The conventional order of chevron patterns would be benefited by changing from K, M, C, Y to be M, K, C, Y or C, K, M, Y. In this way, only yellow would have a doubled alignment error. The yellow is chosen to be furthest away from the black because process color printing can normally tolerate a larger error for the yellow colorant.

Under the assumptions of this example, that is to say perfect registration, the process direction registration error measured according to the present invention is zero because all terms multiplied by V are zero (i.e., $T_{2KM} - T_{1KM}$, $T_{2KK} - T_{1KK}$ and $T_{2MM} - T_{1MM}$ are zero).

Figure 5:
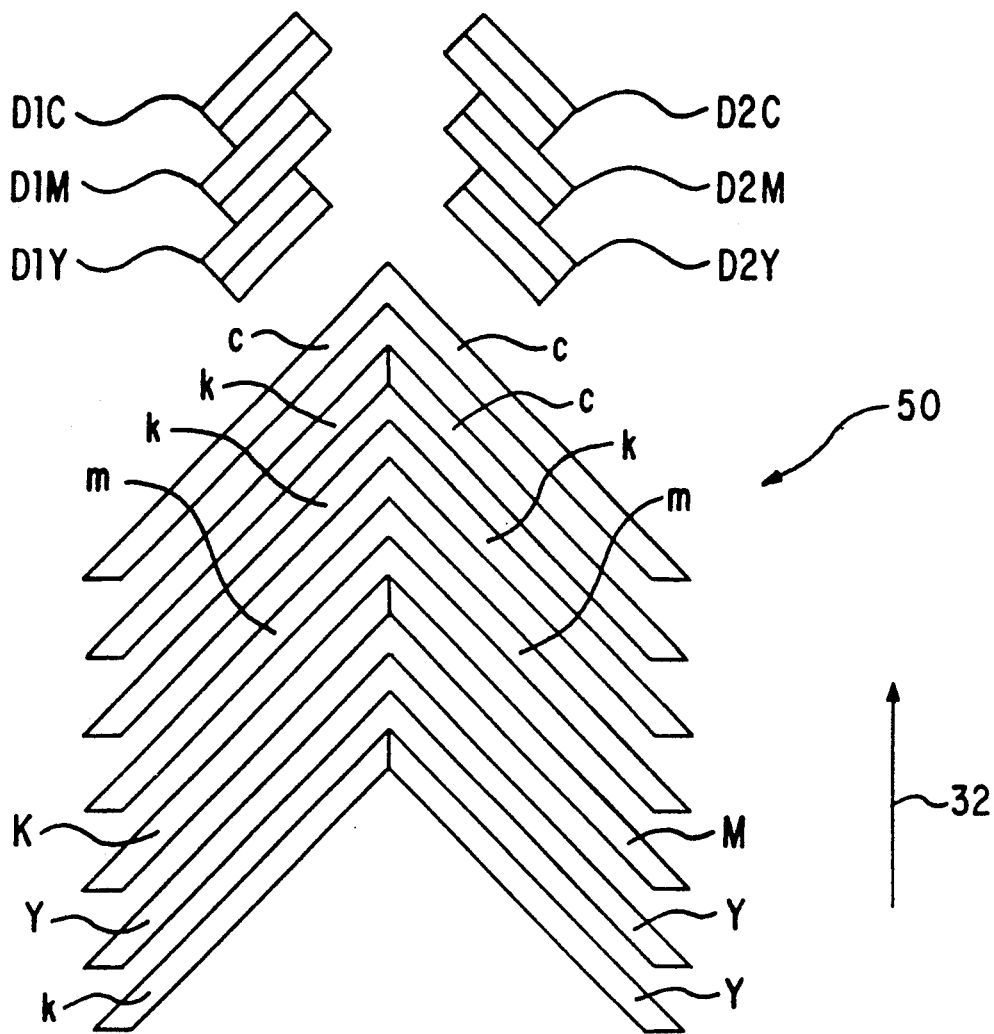
FIG. 5 shows a chevron mark of the present invention for registering three color printers relative to a black printer.

FIG. 5 shows a composite chevron mark 50 having 7 chevrons for aligning a magenta, cyan and yellow printer with a black printer. The 3rd, 4th and 5th chevrons are the same chevrons as shown in mark 40 in FIG. 3 for aligning a black printer with a magenta printer. Mark 50 includes 1st and 2nd chevrons used together with the 3rd chevron for aligning the cyan printer with the black printer and 6th and 7th chevrons used together with the 3rd chevron for aligning the yellow printer with the black printer.

The illumination and the detection of marks can usually be done monochromatically in the near infrared portion of the spectrum. In some applications, where the colorants are transparent to infrared illumination, broad band visible light and appropriate color filtering must be used for proper contrast at the detectors. One embodiment of this concept is shown in FIG. 5.

Figure 2:
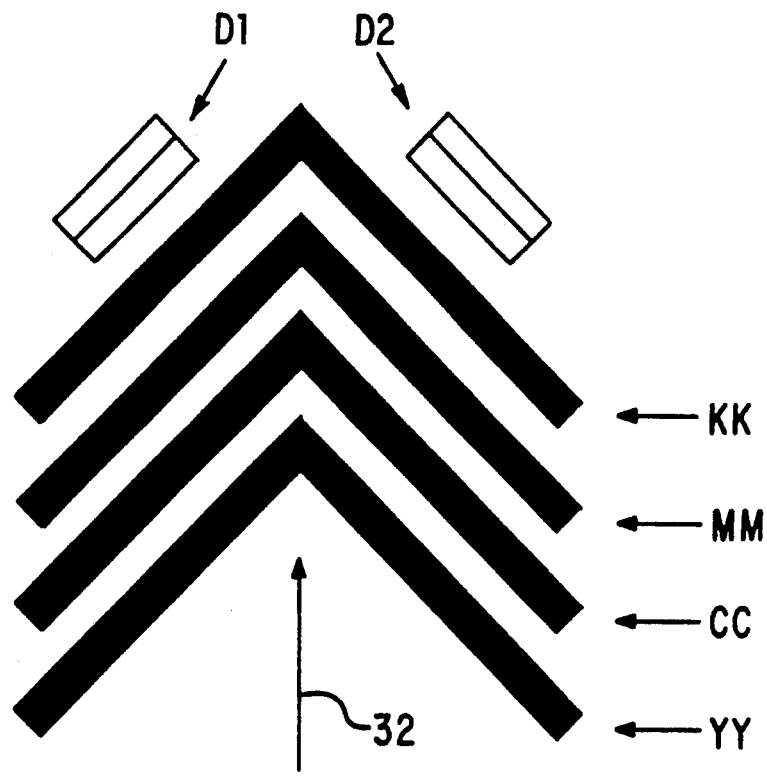
FIG. 2 shows conventional chevron mark for registering three color printers relative to a black printer.

FIG. 5 shows detectors D1C, D1M and D1Y in place of detector D1 of FIG. 2 and shows detectors D2C, D2M and D2Y in place of detector D2 of FIG. 2. Detectors D1C and D2C include a blue filter to detect cyan chevron elements. Detectors D1M and D2M include a green filter to detect magenta chevron elements. Detectors D1Y and D2Y include a red filter to detect yellow chevron elements.

With the image registration marks written and developed on all 4 photoreceptors and transferred to the process medium, a full color image is obtained. From this image, misregistration of the 4 color separations relative to each other is measured. In order to achieve proper signal to noise ratio in spite of the noise induced by the marking process, a multiple mark correlation process may be used with consequent decrease in the maximum achievable spacial resolution. However, a useful measure of the lower frequency components of the relative misregistration of the 4 color images can be obtained.

Imperfections on the photoreceptor surface and other factors may cause stray material to be deposited on the process medium. The stray deposits on the process medium will be detected by detectors D1 and D2 just as the chevron elements are detected. These stray deposits constitute a noise source for the detection system such that the signal detected by the detectors may not represent the exact time of passage of a chevron element by the detector. As more precise color-on-color registration is required, the issue of signal-to-noise ratio becomes more important.

Figure 6:
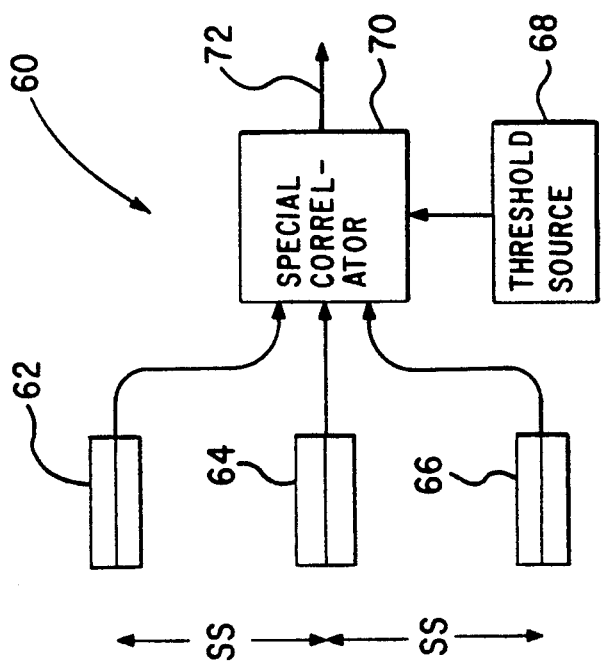
FIG. 6 shows a spacial filter of the present invention.

FIG. 6 shows a spacial filter to improve signal-to-noise ratio. Spacial filter 60 includes detectors 62, 64 and 66. Detector 62 is separated from detector 64 in a process direction by a spacial separation SS, and detector 64 is separated from detector 66 by a spacial separation SS. The outputs of detectors 62, 64 and 66 are fed to spacial correlator 70 where they are correlated and compared to a threshold provided by threshold source 68. The three detectors 62, 64 and 66 are disposed adjacent to and confronting a moving process medium on which marks have been applied. When three marks applied to the moving process medium simultaneously move by corresponding ones of the detector 62, 64 and 66, then the spacial correlator 70 produces spacial filter output 72. The spacial filter may include any number of detectors so long as there are at least two detectors. A detection system using a spacial filter concept includes a first spacial filter as shown in FIG. 6 as a substitute for detector D1 of FIG. 2 or FIG. 3A and a second spacial filter as a substitute for D2 in FIG. 2 or FIG. 3.

Figure 7:
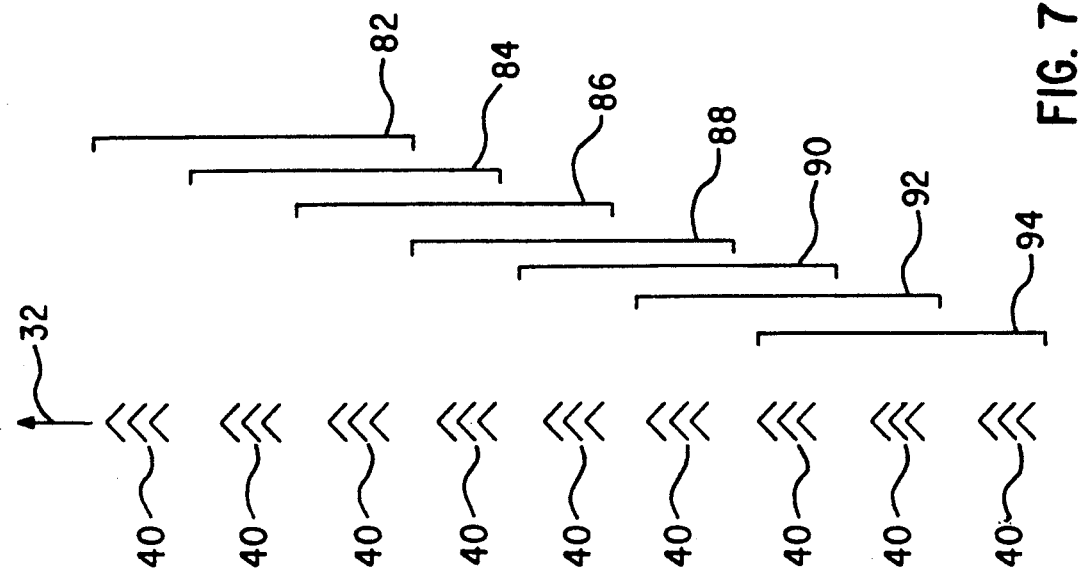
FIG. 7 shows chevron marks to be correlated by a spacial filter.

FIG. 7 shows a plurality of chevron marks 40 (corresponding to mark 40 of FIG. 3) moving in a process direction 32. A spacial filter as shown in FIG. 6 is disposed confrontingly to the moving process medium at a location corresponding to the three marks 40 indicated by bracket 82. As the process media is moved in process direction 32, the three chevron marks indicated by bracket 84 will move into the location confronting the spacial filter, thus producing a second spacial filter output. Similarly, the chevrons indicated by brackets 86, 88, 90, 92 and 94 sequentially move by and confront the spacial filter. As each set of three chevron marks are moved by the spacial filter, correlator 70 produces a spacial filter output 72. It will be appreciated that spacial filter output 72 may be used in place of a signal from a bi-cell detector as described with reference to FIGS. 2 and 3.

The advantages of the spacial filter are numerous. First, the signal-to-noise ratio of the detection is improved. Second, low frequency components of the relative misregistration (i.e., misregistration between marks 40 that persist over many of the sequentially deposited marks) can be precisely measured. Third, high frequency components of the relative misregistration (i.e., misregistration between adjacent marks 40) are filtered and removed by the spacial filter. For example, marks 40 may be applied to a process medium on 0.25 inch centers. A spacial filter with three detectors as shown in FIG. 6 will detect slow shifts in misregistration that persist over distances along the process direction greater than 0.5 inches but will filter and remove registration errors that may exist at distances along the process direction of less 0.5 inches. A spatial filter containing 5 detectors and designed to detect marks applied to the process medium at 0.25 inch intervals will produce a spacial filter for detecting registration errors that persist over a distance of 1 inch or more.

Individual drum encoder errors will induce the drum servo controller to produce rotational velocity variations in individual photoreceptor drums. The rotational velocity variations produced by the individual drum encoder errors integrate to result in a drum rotational position error which may result in and be detected as a registration error on the color image. Registration errors measured according to the present invention that are repeatable over time, and in the process direction over a distance, can be compensated by adjustment of the drum rotational velocity and position. Likewise, such a compensation may be applied to all repeatable registration errors in the process direction, not just the drum encoder errors. This method of compensation is tantamount to calibration and, therefore, this method enables the use of inexpensive encoders so long as the encoders are sufficiently repeatable. This compensation process can be implemented automatically or by human intervention.

In deriving the correct calibration curve for the motion of each of the photoreceptors, it is necessary to account for the effect of the fact that imaging occurs at a point angularly removed from transfer to belt 26. For example, in FIG. 1, imaging occurs at points 22, while transfer is at the contact between the belt and the drums. This effect can be appropriately accounted for mathematically and it is such that the effective registration error can be as much as double the motion error amplitude.

The registration error may include components in the process direction, the lateral direction transverse to the process direction, or may include magnification components in either the process direction or the transverse direction, or both. For example, lateral magnification errors (differences from one printer to another) may be measured by writing two chevron marks laterally displaced from each other on the process media. Differences in the lateral direction error detected from one mark relative to the lateral direction error detected from the other mark indicates a lateral magnification error.

Figure 1:
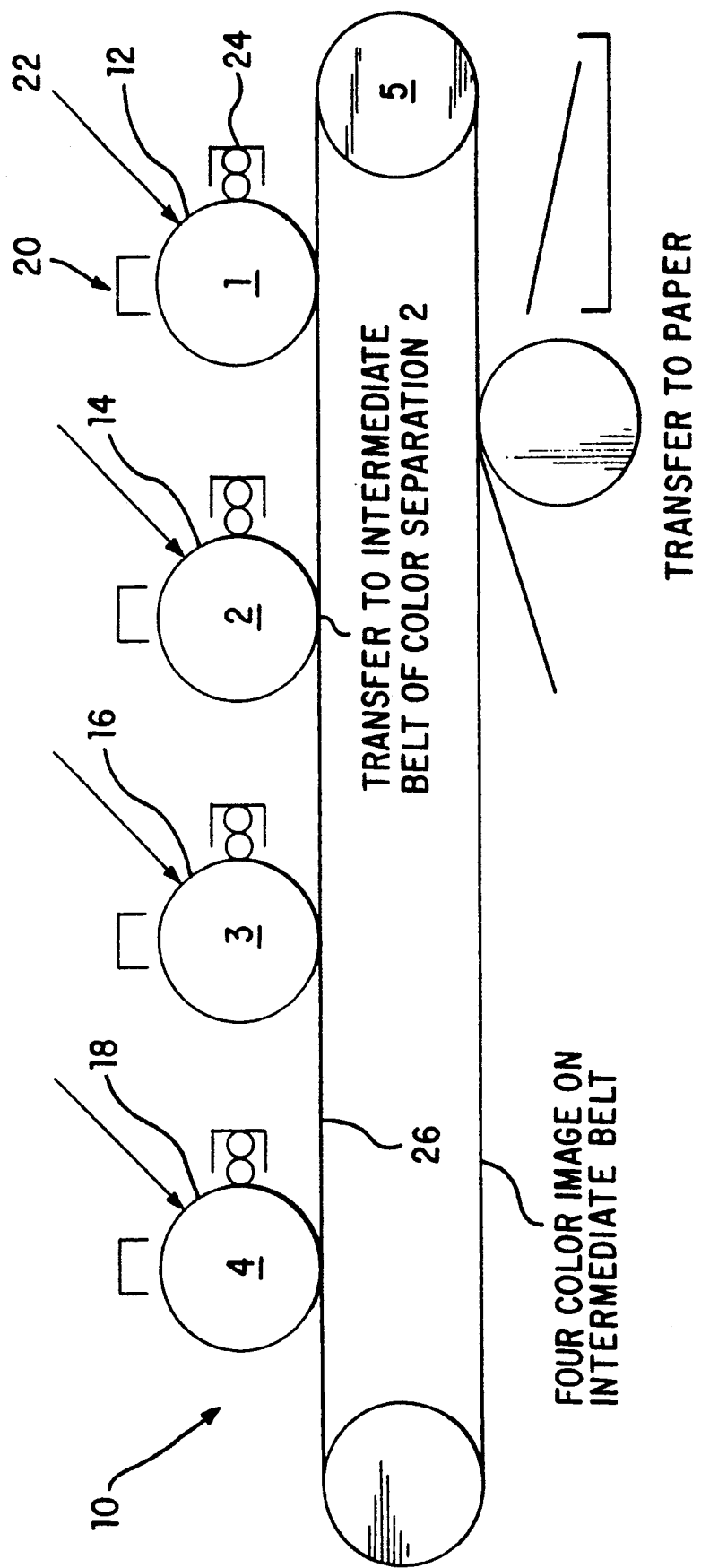
FIG. 1 is a schematic diagram of a four color image output terminal.
Figure 8:
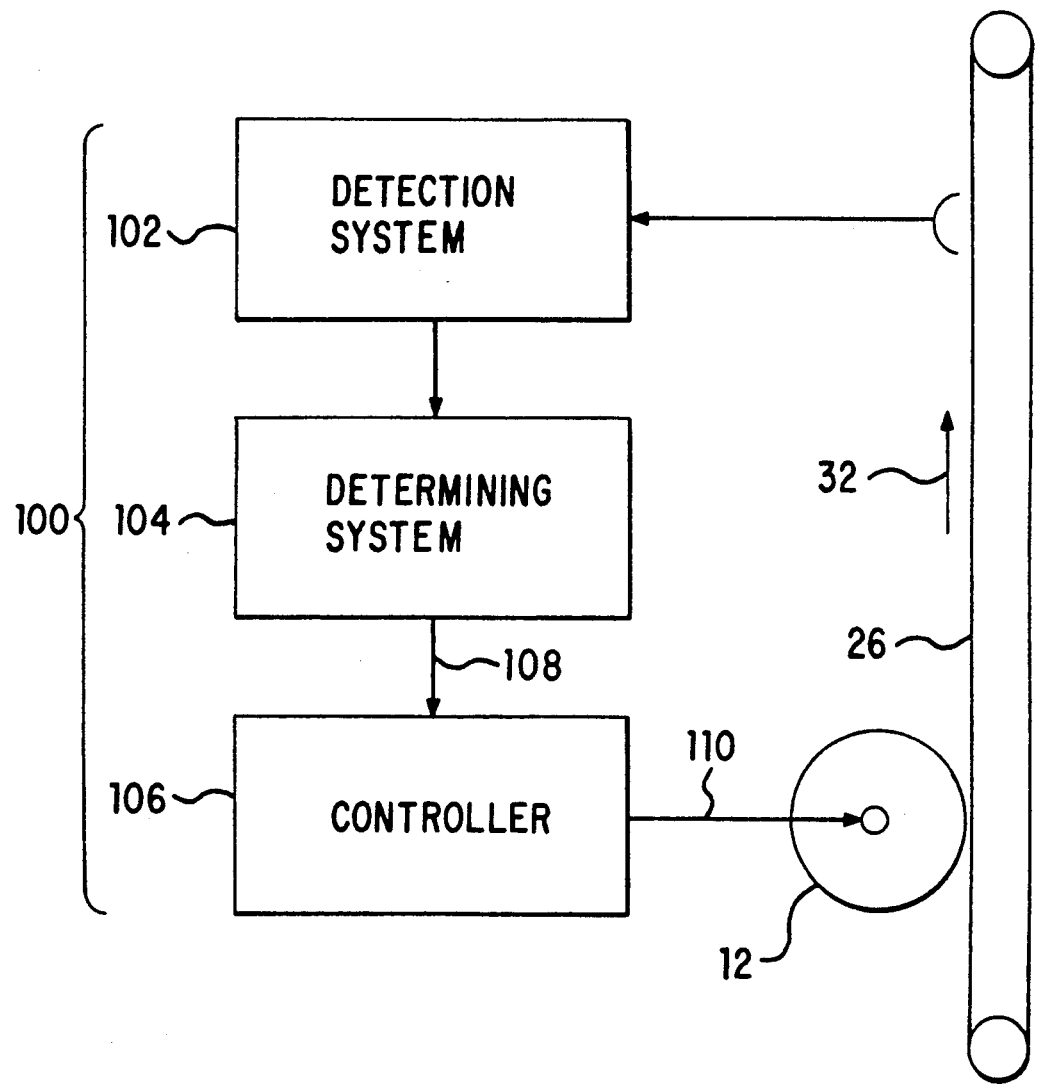
FIG. 8 shows a block diagram of a control system of the present invention.

In FIG. 8, a control system 100 includes detection system 102, determining system 104 and controller 106. Detection system 102 may advantageously be based on either a bi-cell detector, CCD detector or a spacial filter. The outputs of the detection system are passed to a determining system where a process direction registration error signal 108 is determined. Controller 106 produces drive signal 110 based on registration error signal 108. FIG. 8 shows an intermediate belt 26 as a process medium and a photoreceptor 12 as shown in FIG. 1 representing a color printer. FIG. 8 also indicates process direction 32 as shown in FIGS. 2 and 3. Detection system 102 measures the sequence of marks applied on the process medium and determining system 104 determines the corresponding sequence of process direction registration error signal 108. Controller 106 operates according to known control principles to produce drive signal 110 to drive photoreceptor 12 to a rotational position and at a rotational velocity that will minimize misregistration in the process direction based on the sequence of process direction registration error signals 108. It will be appreciated that the detection system measures the misregistration of one color applied to the intermediate belt 26 by the photoreceptor 12 relative to a black color applied to intermediate belt 26 by a black photoreceptor/printer (not shown). Thus, a full color control system includes a control system 100 for each color to be registered with respect to the black printer.

FIG. 8 does not intend to portray the control scheme to be necessarily operating in a continuous closed loop fashion. Instead, the calibration data may be obtained once and then assumed to remain constant for long periods of time. Updates are obtained only when major machine disruptions have taken place such as relocating the machine or at appropriately long time intervals.

Some registration error measurement techniques for measuring process direction registration errors, such as the one based on chevron marks and bi-cell detectors which was described above, can also measure registration errors such as in lateral position, lateral magnification, skew, etc. and can be used in processes for their correction. As mentioned above, an example of such errors is the variation in lateral magnification due to photoreceptor drum eccentricity coupled with raster output scanner (ROS) imaging. Another example is the wandering in the lateral registration due to wobble of photoreceptor drums coupled with ROS imaging. These repeatable errors can also be corrected by appropriate modulation of the data frequency in the ROS beam to control the rate of data written by the ROS and by appropriately controlling the time interval which delays the start of data from the start of scan signal for each line. As in the case of the photoreceptor motion errors, the calibration tables must be referenced to the encoder index or some other means of controlling the phase of the photoreceptor drum motion.

The technique described above for the compensation of errors in the sagittal or process direction due to motion irregularities of the photoreceptor drums produces a relative correction table; i.e., for each of the colorants with respect to one of them, such as black. Due to the fact that the phase relation of the drums with one another cannot be assumed to remain constant, the reference drum, such as the black one in this example, must have good motion control. This means an accurate encoder mounted on the rotational axis of the drum without inducing errors. The photoreceptor drums of the other colorants can be inaccurate as long as they are repeatable.

With respect to registration errors in the lateral direction, such as magnification and lateral shift, the measurements indicated in the above description of this invention also make evaluations relative to a reference colorant such as black. However, in this case, the errors associated with the eccentricity and wobble of the reference photoreceptor drum alone can be evaluated directly from the chevron of that colorant. If chevrons are printed on both sides of the page, the lateral shift of the colorant with respect to the registration sensor can be measured. Using black as an example, the local lateral shift is $$L = 0.5*(T_{1KK} - T_{2KK})*V$$

which can be evaluated on the inboard and the outboard side of the page. The local magnification with respect to the distance between sensors is given by the difference between inboard and outboard lateral shifts $$M = L_{outboard} - L_{inboard}$$

This information allows the construction of correction tables for each of the photoreceptor drums with timing referred to their respective encoder indexes.

The invention has been described with reference to its preferred embodiments which are intended to be illustrative and not limiting. Various changes may be made without departing from the spirit and scope of the invention as defined in the following claims.

What is claimed is:

1. An alignment system for a color output terminal comprising:
    sensing means for sensing an alignment error between a first printer having a first drum and a second printer having a second drum, the sensing means including,
        marking means for applying to a process medium a first chevron from the first printer, a second chevron from the second printer and a third chevron from both the first printer and the second printer, the third chevron having a first element applied from the first printer and a second element applied from the second printer,
        detection means for detecting a matrix of times comprising three pluralities of times, each of the three plurality of times corresponding to a respective time of passage of said first, second and third chevrons by said detection means, and
        determining means for determining the alignment error based on a function of the three pluralities of times; and,
    control means for minimizing the alignment error, the control means including,
        calibrating means for producing a calibration table representative of a repeatable component of the alignment error as a function of a rotation phase angle, and
        correction means for minimizing the alignment error based on a function of the calibration table.

2. The alignment system of claim 1, wherein:
    the first and second chevrons each include a first element and a second element;
    the three pluralities of time each include a first time and a second time;
    said detection means detects a first set of three times, each time of the first set of three times corresponding to the first time of each of the three pluralities of times and the first time of each of the three pluralities of times corresponding to a time of passage of the first element of a respective one of said first, second and third chevrons by said detection means; and
    said detection means further detects a second set of three times, each time of the second set of three times corresponding to the second time of each of the three pluralities of times and the second time of each of the three pluralities of times corresponding to a time of passage of the second element of a respective one of said first, second and third chevrons by said detection means.

3. The alignment system of claim 2, wherein said determining means determines the alignment error based on a function of the first set of three times and the second set of three times.

4. The alignment system of claim 1, wherein:
    the first and second chevrons each include a first element and a second element;
    the three pluralities of times each include a first time and a second time;
    the matrix of times includes a first set of three times including the first time from each of the three pluralities of times and a second set of three times including the second time from each of the three pluralities of times; and
    said detection means includes a first bi-cell detector and a second bi-cell detector, said first bi-cell detector detecting the first set of three times and said second bi-cell detector detecting the second set of three times.

5. The alignment system of claim 1, wherein the correction means minimizes the alignment error continuously during an operation time when the color output terminal is operating and the calibration means produces the calibration table during a calibration time, the calibration time being a portion of the operation time.

6. The alignment system of claim 1, wherein the alignment error minimized by the correction means includes a process direction component, a lateral direction component and a magnification component.

7. The alignment system of claim 1 further comprising a raster output scanner for writing image data to one of the first and second printers, wherein the correction means controls a rate of the image data written by the raster output scanner.

8. The alignment system of claim 1 further comprising a raster output scanner for writing image data to one of the first and second printers, wherein the correction means controls a start of a line of the image data written by the raster output scanner.

9. The alignment system of claim 1, wherein the correction means controls a rotational velocity of the first drum relative to a rotational velocity of the second drum so that a process direction component of the alignment error is minimized.

10. The alignment system of claim 1, wherein the color output terminal includes a raster output scanner and said correction means includes drive means for driving the raster output scanner according to a calibration table so that a lateral direction component of the alignment error is minimized.

11. An alignment system for a color output terminal comprising:
   sensing means for sensing an alignment error between a first printer and a second printer; and
   control means for minimizing the alignment error;
   wherein,
   the sensing means includes,
      marking means for applying to a process medium a first chevron from the first printer, a second chevron from the second printer and a third chevron from both the first printer and the second printer, the third chevron having a first element applied from the first printer and a second element applied from the second printer,
      detection means for detecting a matrix of times comprising three pluralities of times, each of the three plurality of times corresponding to a respective time of passage of said first, second and third chevrons by said detection means, and
      determining means for determining the alignment error based on a function of the three pluralities of times.

12. An alignment system for a color output terminal comprising:
   sensing means for sensing an alignment error between a first printer and a second printer; and
   control means for minimizing the alignment error, the control means including,
      calibration means for producing a calibration table representative of a repeatable rotational phase angle dependent component of the alignment error as a function of rotational phase angle, and
      correction means for minimizing the alignment error based on a function of the calibration table.

13. A sensing system for sensing an alignment error between a first printer and a second printer based on a mark applied to a process medium having a first chevron from the first printer, a second chevron from the second printer and a third chevron from both the first printer and the second printer, the third chevron having a first element applied from the first printer and a second element applied from the second printer, the sensing system comprising:
   detection means for detecting a matrix of times comprising three pluralities of times, each of the three plurality of times corresponding to a respective time of passage of the first, second and third chevrons by said detection means; and
   determining means for determining the alignment error based on a function of the matrix of times.

14. The sensing system of claim 13, wherein:
   the detection system further detects an additional alignment error between a third printer and the first printer and the mark further has a fourth chevron from the third printer and a fifth chevron from both the third printer and the first printer, the fifth chevron having a first element applied from the third printer and a second element applied from the first printer;
   the matrix of times further comprise a fourth and a fifth plurality of times corresponding to a respective time of passage of the fourth and fifth chevrons by said detection means; and
   said determining means includes means for determining the additional alignment error based on a function of the matrix of times.

15. A sensing system for sensing an alignment error between a first printer and a second printer, the sensing system comprising:
   marking means for applying to a process medium a first chevron from the first printer, a second chevron from the second printer and a third chevron from both the first printer and the second printer, the third chevron having a first element applied from the first printer and a second element applied from the second printer;
   detection means for detecting a matrix of times comprising three pluralities of times, each of the three plurality of times corresponding to a respective time of passage of said first, second and third chevrons by said detection means; and
   determining means for determining the alignment error based on a function of the three pluralities of times.

16. The sensing system of claim 15, wherein said detection means includes a spacial filter.

17. A control system in a machine for minimizing an alignment error between a first rotating member and a second rotating member, the control system comprising:
   calibration means for producing a calibration table representative of a repeatable component of the alignment error, and
   correction means for minimizing the alignment error based on a function of the calibration table.

18. A control system for minimizing an alignment error between a first printer and a second printer, the control system comprising:
   marking means for applying to a process medium a first chevron from a first printer, a second chevron from a second printer and a third chevron from both the first printer and the second printer;
   detection means for detecting a matrix of times comprising three pluralities of times, each of the three pluralities of times corresponding to a time of passage of a respective one of said first, second and third chevrons by said detection means;
   determining means for determining the alignment error based on a function of the matrix of times; and
   control means for controlling one of the first printer and the second printer to minimize the alignment error.

19. The control system of claim 18, wherein said control means includes means for controlling a rotating velocity of one of the first printer and the second printer relative to a rotational velocity of the other of the first printer and the second printer so that the alignment error is minimized.

20. A control system for controlling alignment between printers based on a mark applied to a process medium, the mark having a first chevron from a first printer, a second chevron from a second printer and a third chevron from both the first printer and the second printer, the control system comprising:

detection means for detecting a matrix of times comprising three pluralities of times, each of the three pluralities of times corresponding to a time of passage of a respective one of the first, second and third chevrons by said detection means;

determining means for determining an alignment error based on a function of the matrix of times; and control means for controlling one of the first printer and the second printer to minimize the alignment error.

21. The control system of claim 20, wherein said control means includes means for controlling a rotational velocity of one of the first printer and the second printer relative to a rotational velocity of the other of the first printer and the second printer so that the alignment error is minimized.

22. A control system for controlling alignment between printers in a process direction, the control system comprising:

detection means for detecting a matrix of a plurality of times corresponding to a time of passage of a plurality of registration marks by said detection means;

determining means for determining an alignment error in a process direction based on a function of the plurality of times in the matrix; and control means for controlling a printer rotational velocity to minimize the alignment error.

\* \* \* \* \*